United States Patent
Keely et al.

(10) Patent No.: US 6,194,064 B1
(45) Date of Patent: Feb. 27, 2001

(54) PRESSURE SENSITIVE ADHESIVE FOR DECORATIVE FILMS WITH REMOVABLE AND REPOSITIONABLE PROPERTIES

(75) Inventors: David R. Keely, Morgantown; Richard C. Oldack, Bridgeport, both of WV (US)

(73) Assignee: Dyna-Tech Adhesive, Inc., Grafton, WV (US)

( * ) Notice: Subject to any disclaimer, the term of this patent is extended or adjusted under 35 U.S.C. 154(b) by 0 days.

(21) Appl. No.: 08/984,271

(22) Filed: Dec. 3, 1997

(51) Int. Cl.[7] ....................................... B32B 7/12
(52) U.S. Cl. ................... 428/355 RA; 428/317.1; 428/355 BL; 428/355 AC; 428/356
(58) Field of Search ................... 428/317.1, 355 RA, 428/355 AC, 355 BL, 356

(56) References Cited

U.S. PATENT DOCUMENTS

| | | | |
|---|---|---|---|
| 3,314,838 | 4/1967 | Erwin | 156/71 |
| 3,331,729 | 7/1967 | Danielson et al. | 161/162 |
| 3,554,835 | 1/1971 | Morgan | 156/234 |
| 3,663,269 | 5/1972 | Fischer et al. | 117/76 A |
| 3,857,731 | * 12/1974 | Merrill, Jr. et al. | 428/314.4 |
| 4,376,151 | * 3/1983 | Parrotta | 428/323 |
| 4,684,685 | * 8/1987 | Shuman et al. | 524/270 |
| 5,141,790 | 8/1992 | Calhoun et al. | 428/40 |
| 5,192,612 | * 3/1993 | Otter et al. | 428/355 RA |
| 5,362,516 | 11/1994 | Wilson et al. | 427/207.1 |
| 5,487,929 | 1/1996 | Rusincovitch, Jr. et al. | 428/40 |
| 5,639,539 | * 6/1997 | DeProspero et al. | 428/195 |

FOREIGN PATENT DOCUMENTS

| | | | |
|---|---|---|---|
| 93305163 | 7/1993 | (EP) | D21H/27/20 |
| 2 117 271 | 10/1983 | (GB) | E04F/13/00 |

* cited by examiner

*Primary Examiner*—Blaine Copenheaver
*Assistant Examiner*—Ula C. Ruddock
(74) *Attorney, Agent, or Firm*—Steptoe & Johnson

(57) ABSTRACT

The present invention is a pressure sensitive adhesive for use on a wallcovering to cover a surface such that the wallcovering is repositionable and removable without damage to the surface. The pressure sensitive adhesive is made by combining a plurality of water based acrylic emulsions and a plurality of hollow glass bubbles having a density and size to be present at the surface of the pressure sensitive adhesive and reduce initial tack to allow movement of the wallcovering on the wall surface. The hollow glass bubbles halve a density within the range of 0.05 to 0.10 g/cc and a size within the range 40 to 177 microns in diameter. Additives can be added to the pressure sensitive adhesive of the present invention such as surfactants, defoamers, thickeners, and tacking resins. The pressure sensitive adhesive is applied to a wallcovering and dried to evaporate the water content. Once the wallcovering is positioned on a surface, the user applies pressure to the wallcovering crushing the hollow glass bubbles, thereby allowing the adhesive to contact the surface and hold the wallcovering in place.

29 Claims, 1 Drawing Sheet

PRESSURE SENSITIVE ADHESIVE FOR DECORATIVE FILMS WITH REMOVABLE AND REPOSITIONABLE PROPERTIES

BACKGROUND OF THE INVENTION

1. Field of the Invention

This invention relates to pressure sensitive adhesives (PSA) used in wallcoverings, borders, appliques and the like, and more specifically, to a PSA containing hollow glass bubbles allowing wallcovering to be both removable and repositionable.

2. Related Art

Wallcovering products have traditionally been attached to a wall surface using aqueous starch or cellulosic based pastes. The paste composition is brushed onto the surface of the wallcovering immediately before applying to the wall surface. For prepasted wallcovering, the adhesive is coated and dried on the wallcovering surface during manufacture. Prior to hanging, the paste is activated by soaking the wallcovering sheets in water. These traditional types of wallcovering paste have many inherent disadvantages. When paste is brushed on a wallcovering surface, there is a wide variation in the amount applied. The process of applying paste and soaking of prepasted wallcovering is time consuming and very messy. The resultant wallcoverings are also initially very wet and can be easily distorted and even torn during application to a wall surface and during trimming. Once applied to a wall, wet wallcoverings shrink as they dry causing seam separation and lifting. Therefore, an improved adhesive composition is desirable for attaching wallcovering products to a wall surface.

The prior art describes attempts to overcome the deficiencies of traditional paste adhesives. For example, Erwin, U.S. Pat. No. 3,314,838, describes a pressure sensitive adhesive composition containing hollow glass microspheres which is first applied to the wall surface and dried. A decorative film such as a wallcovering applied to the surface of the adhesive composition on the wall can be easily slid into position. A permanent bond is obtained by application of pressure which crushes the microspheres. However, Erwin does not address the problem of variation in the amount of adhesive composition on the wall resulting from hand application. Considerable time is also required to apply and dry the adhesive composition on the wall. Further, the adhesive composition of Erwin is permanent since removal from the wall results in damage to the wallpaper or the wall surface.

Danielson and Berg, U.S. Pat. No. 3,331,729, describe a pressure sensitive sheet material and method of application whereby the sets are easily repositioned during application to a floor surface. In manufacture of this product, hollow microspheres are electrostatically applied to a web of thermoplastic polymer coated paper. This thermoplastic polymer is primarily polyethylene which can be easily softened with heat and allow the glass microspheres to penetrate up to one half of their diameter into the softened film. A pressure sensitive adhesive composition is then coated on the polymer film with embedded microspheres. A decorative film is then laminated to the adhesive surface to form the final construction. To apply the decorative film to a surface like a floor, the polyethylene film is first stripped from the product to expose the adhesive surface covered with protruding microspheres. The resultant product is easily slid into position and then pressure is applied to crush or distort the microspheres to bring the floor and adhesive into contact. This prior art, however, has several disadvantages. The process of softening the polyethylene film to embed the hollow microspheres is difficult to control. The process is also limited to thermoplastic films with relatively low softening points like polyethylene. Further, the disclosed adhesives are strong and thus, for example, do not allow removal from a wall surface without causing damage.

Morgan, U.S. Pat. No. 3,554,835, describes a slidable adhesive laminate which has spaced dots of release material on the surface. Special processing methods are needed to produce this laminate. The release material also remains and contaminates the product and affects adhesion properties.

Fischer and Whalen, U.S. Pat. No. 3,663,269, describe wallcovering having an encapsulated adhesive layer which is repositionable before heat and pressure is applied. The process to make encapsulated products is involved and very expensive. The adhesive is heat activatable at 190° to 200° F. To uniformly apply heat while installing wallcovering would also be difficult and time consuming.

Reed and Stafford in U.S. Pat. No. 4,054,697 describe PSA coated decorative sheet materials which can be slid on a substrate surface. The PSA layer is covered with particles of urethane foam which is deformed under pressure to expose the adhesive and form a bond with a wall, floor or countertop. The PSA for the application needs to be strong to keep the foam particles from recovering. Curable adhesive compositions are desirable for this. Such adhesives would be expected to form a permanent bond with the substrate and not be removable.

Parrotta, U.S. Pat. No. 4,376,151, describes a business form that has a PSA which is covered with microspheres. Application of pressure displaces the microspheres and exposes the tacky adhesive. The adhesive is first coated on the substrate and the microspheres are coated on top of the adhesive. Alternatively, low density microspheres are mixed with the adhesive, and after coating on a substrate, they float to the surface of the adhesive. The adhesive for the resultant business form is described as permanent and cannot be removed without tearing the substrate.

Calhoun and Koskenmaki, U.S. Pat. No. 5,141,790, describe a repositionable adhesive tape that has spaced clumps of glass bead particles distributed over the surface of the PSA. The process to produce this product is difficult because the clumps are made by filling depressions either in a carrier web or in a rotating transfer drum.

Wilson, Meixner, Bemis, Calhoun and Ree, U.S. Pat. No. 5,362,516, describe a method of making a repositionable adhesive sheet which has a microstructure surface comprising a plurality of adhesive pegs which can contain beads. Firm bonds are obtained by compressing the pegs to increase contact area. Special processing methods are also required to place regularly spaced adhesive pegs on the sheet surface.

DeProspero, Banas, Muny and Frye, U.S. Pat. No. 5,639,539 describe a releasable wallcovering which uses a pressure sensitive adhesive layer formed of tacky polymeric microspheres. However, a wallcovering product using this type of adhesive could not be easily slid on a wall surface for repositioning. To reposition such a wallcovering, the wallcovering must be removed from the wall and reapplied in a new position. Therefore, working with this type of wallcovering requires extra skill and time, and increases the likelihood of tearing the wallcovering.

Rusincovitch and Roe, EP 0609603A1, disclose a repositionable wallcovering in which the adhesive layer is covered with a web or net which limits contact with a wall until pressure is applied. These inventors also disclose in U.S. Pat. No. 5,487,929 a decorative sheet material which has a pattern coated adhesive with non adhesive projections. It was important to have an adhesive pattern with specific size and shape. The products described in these inventions require extra manufacturing steps and related costs.

Gibson, GB Patent 2,117,271, describes a wallcovering adhesive which is foamed to limit initial contact with the wall. Pressure collapses the foamed adhesive to form the bond. The adhesive surface also must have a high energy heat treatment to provide a porous non tacky surface.

All of the prior art mentioned above have limitations. In many cases, the need for both repositionability and removability is not addressed. In other cases, special manufacturing methods are required which cause product variability and add cost.

Therefore, there is a need for an adhesive layer for wallcover that uses a pressure sensitive adhesive, resulting in the wallcovering having both removable and repositionable properties.

SUMMARY OF THE INVENTION

The present invention solves the problems associated with adhesives of the prior art by providing an adhesive comprised of a pressure sensitive adhesive (PSA) containing a plurality of hollow glass bubbles. When the adhesive of the present invention is applied to a decorative sheet, the resulting wallcovering is both repositionable on and removable from a wall surface.

In the preferred embodiment of the present invention, the pressure sensitive adhesive is made from a plurality of water based acrylic or acrylic copolymer emulsions that give a balance of properties providing good anchorage of the wallcovering to a wall surface and allowing for removal of a wallcovering without damage to the wall surface. Optionally, one or more processing aids may be added to the pressure sensitive adhesive of the present invention such as surfactants, defoamers, thickeners, and tackifying resins to assist manufacturers with coating a decorative sheet.

The preferred embodiment of the adhesive of the present invention also contains a plurality of hollow glass bubbles having a density and size to be present at the surface of the pressure sensitive adhesive and reduce initial tack to allow movement of the wallcovering on the wall surface. The diameter of the hollow glass bubbles must be greater than the thickness of the pressure sensitive adhesive to provide for the contact of the hollow glass bubbles with the wall surface when applying and positioning the wallcovering.

This use of hollow glass bubbles is novel in that the prior art only uses hollow glass microspheres to lower the density of plastics. Such hollow glass miscrospheres are not commercially used in adhesives. In contrast, the present invention uses hollow glass bubbles in an adhesive to create a wallcovering that is both repositionable and removable.

The adhesive of the present invention can be used with various types of decorative sheets used for various applications, e.g., wallcoverings, decorative borders, appliques, window blinds, posters, shelf paper and the like. Types of decorative sheet useful for these applications include wallpaper, paper backed vinyl, vinyl coated paper and fabric backed vinyl. These products are useful for use in residential as well as commercial buildings. The products exhibit good anchorage to a variety of wall surfaces without evidence of edge lifting and can be removed without causing damage. Types of wall surfaces with good anchorage and removability include plaster, wood, gypsum type dry wall, various types of paint, wallpaper and vinyl wallcovering.

Repositionable wallcovering allows for the movement of the decorative sheet on a surface, such as a wall, before the wallcovering is anchored to the surface. Repositionability allows for positioning a decorative sheet on the surface and for the matching of patterns between adjacent decorative sheets. After positioning, a user applies moderate pressure to crush the hollow glass bubbles and create a bond between the PSA of the adhesive on the wallcovering with the wall surface which is reliably strong to attach the decorative sheets to the wall without any evidence of edge curl or wing-up.

Another advantage is that the adhesive of the present invention also allows a decorative sheet to be removed from many types of wall surfaces without causing any damage to a wall. Therefore, a user can redecorate a wall without added time, effort, or expense needed to repair the wall after such removal.

Another advantage is that when a decorative sheet with an adhesive layer of the present invention is applied to a wall or other surfaces there is no shrinkage of the decorative sheet after its application The decorative sheet maintains its shape and size after drying, resulting in a high quality finished product. In contrast, when a conventional wet paste is used to apply a decorative sheet to a wall, the decorative sheet shrinks upon drying, resulting in the decorative sheet peeling or having curled edges.

Another advantage of the present invention is that the adhesive and wallcovering of the present invention can be manufactured using equipment and processes which are currently available and well established in the adhesive coating industry. Additional training and equipment is not required.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
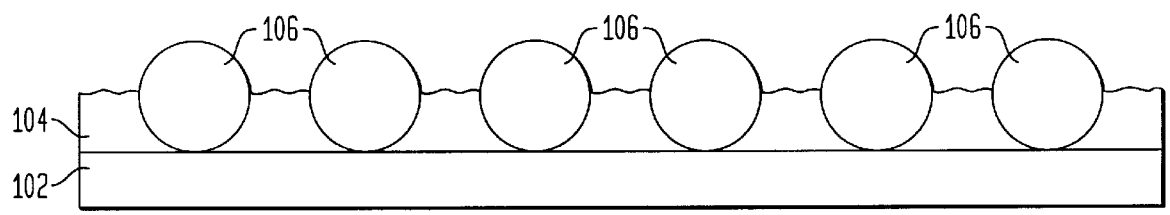
FIG. 1 is a schematic view of a pressure sensitive adhesive of the present invention added to a wallcovering.

The preferred embodiment of the present invention is shown in FIG. 1. A wallcovering 100 comprises a decorative sheet 102 coated with an adhesive layer that is the combination of a pressure sensitive adhesive (PSA) 104 and a plurality of hollow glass bubbles 106. The PSA 104 is chosen to give a balance of properties which provide good anchorage to a variety of wall surfaces and yet allow for removal of the wallcovering 100 without damage to a wall surface.

The preferred PSA 104 of the present invention is a combination of a plurality of water based acrylic emulsions wherein one acrylic polymer or copolymer has a glass transition temperature in the range of −35 to 45° C. and a second acrylic polymer or copolymer has a glass transition temperature in the range of −50 to −65° C. Water based acrylic emulsions are well known in the relevant art and are commercially available. Further, it would be readily apparent to one of ordinary skill in the relevant art to develop such a preferred PSA of the present invention. The PSA of the present invention is described in terms of a plurality of water based acrylic emulsions for convenience purposes only. It also would be readily apparent to one of ordinary skill in the relevant art to develop and use a comparable type of PSA.

The acrylic polymers and copolymers of the preferred embodiment are prepared by polymerizing one or more acrylate monomers in water containing surfactants using free radical type initiators. Typical monomers used for making acrylic emulsions suitable for the preferred embodiment of the present invention include ethyl acrylate, butyl acrylate, octyl acrylate, 2-ethylhexyl acrylate and acrylic acid. Other types of monomers can be copolymerized with the acrylate monomers to provide specific properties such as methyl methacrylate, butyl methacrylate, acrylonitrile and vinyl acetate.

In an alternative embodiment, other types of water based polymeric emulsions useful for the PSA 104 of the adhesive layer of the present invention include styrene/butadiene emulsions, vinyl acetate emulsions and natural rubber latex. These rubber based emulsions are commonly used with a tackifying resin described in more detail below. Combinations of latex products can also be advantageously used. Rubber based emulsions and latex products are well known in the relevant art and are commercially available. It would be readily apparent to one of ordinary skill in the relevant art to develop such a PSA 104 for use with the adhesive layer of the present invention.

In anther alternative embodiment, the PSA 104 of the present invention is one water based acrylic emulsion comprised of an acrylic polymer having a glass transition temperature in the range of −35 to 45° C. Such acrylic polymers are well known in the relevant art and are commercially available. It would be readily apparent to one of ordinary skill in the relevant art to develop such a PSA 104 for use with the adhesive layer of the present invention.

In another alternative embodiment, the PSA 104 is a permanent adhesive such that the resulting adhesive layer of the present invention is used on wallcoverings for fleet advertising, flooring, or bill-boards. Permanent adhesives are well known in the relevant art and are commercially available. It would be readily apparent to one of ordinary skill in the relevant art to develop such an PSA 104 for use with the adhesive layer of the present invention.

Processing aids may also be added to the PSA 104 of the adhesive layer of the present invention to provide good coatability on various types of decorative sheets 102. These processing aids include surfactants, defoamers, thickeners, and tackifying resins. Although, the preferred PSA 104 of the adhesive layer of the present invention is a straight acrylic composition, it is possible to add such tackifying resins to further modify properties of the PSA 104 if needed. Tackifying resins useful with water based acrylic adhesives include rosins, rosin ester resins, aliphatic/aromatic or aromatic hydrocarbon resins and resins based on terpene derivatives.

Repositionability of a decorative sheet 102 coated with a PSA 104 of the present invention is provided by adding hollow glass bubbles 106 of specified properties to the PSA 104. This is a novel use of hollow glass bubbles 106 because hollow glass microspheres of the prior art are used only to lower the density of plastics and are not commercially used in adhesives.

The hollow glass bubbles 106 of the present invention are of sufficient density and size to be present at the surface of the PSA 104 and to reduce initial tack or grab thereby allowing movement of the wallcovering 100 on a wall surface. A preferred density of the hollow glass bubbles 106 is approximately 0.05–0.10 g/cc. Hollow glass bubbles 106 with densities up to 0.23–0.27 are also useful for the purposes of the present invention. Preferred sizes for the hollow glass bubbles range from 40 to 177 microns in diameter. The preferred embodiment of the present invention uses commercially available 3M Scotchlite Glass Bubbles. Hollow glass bubbles are well known in the relevant art and are described in these terms for convenience purpose only. It would be readily apparent to one of ordinary skill in the relevant art to use alternative commercially available hollow glass bubbles having the sane or comparable specifications. Also, it would be readily apparent to one of ordinary skill in the relevant art to use a comparable type of hollow bubbles, e.g., hollow ceramic or plastic bubbles, depending on the specific environment, in a pressure sensitive adhesive.

The final bond of the wallcovering 100 with the wall surface is attained by crushing a sufficient amount of the hollow glass bubbles 106 in the adhesive layer to allow firm contact of the PSA 104 with the wall. The crushing of the hollow glass bubbles 106 is accomplished by applying pressure to the wallcovering 100 with a roller. Other tools can be used to crush the hollow glass bubbles 106 such as wallpaper hangers trowels, and the like. Preferably, the hollow glass bubbles 106 are of the type which have sufficient strength to allow mixing with the PSA 104 by ordinary means such as stirring under moderate conditions. Furthermore, the hollow glass bubbles 106 must not be too strong so that excessive pressure is required to crush them. Excessive pressure would cause damage to the decorative sheet 102 of the wallcovering 100.

The strength of the hollow glass bubbles 106 is measured using a nitrogen pressure test. For the preferred hollow glass bubbles 106, there is an eighty percent (80%) survival at a pressure of 250 psi. In an alternative embodiment, hollow glass bubbles 106 that are useful for the purpose of the present invention have an eighty percent (80%) survival rate with pressures up to 750 psi.

The adhesive of the present invention is prepared by conventional means. The PSA 104, hollow glass bubbles 106, surfactants, defoamers, and thickeners are added to a suitable vessel. The contents of the vessel are agitated at a moderate rate using a conventional paddle or propeller type stir blade. The resultant adhesive is stored in a closed container until use.

The adhesive of the present invention is coated on a decorative sheet 102 also using conventional coating equipment used in the pressure sensitive adhesive industry such as gravure coaters, roll coaters, slot die coaters, curtain coaters and mayer rod type coaters. In the preferred embodiment, the adhesive is coated directly onto a decorative sheet 102, creating the wallcovering 100. Next, the water present in the adhesive is evaporated by heating the wallcovering 100 in a conventional oven or an infrared dryer. In the preferred embodiment, the decorative sheet 102 has a release layer on its surface so that the wallcovering 100 can be wound into rolls. Suitable release layers include various waxes, silicones or fluoropolymer coatings. It is important that the finished wallcovering 100 not be wound too tightly into rolls to prevent premature collapse of the hollow glass bubbles 106. The rolls of wallcovering 100 should also be stored in an upright, vertical position rather than horizontal to avoid uneven pressure on one side during storage.

The following examples further demonstrate the present invention. These examples are for demonstration purposes only and are not to limit or restrict the scope of the invention.

COMPARATIVE EXAMPLE 1

A commercially available acrylic latex (70 dry parts, 52% solids, Tg=−35° C.) is blended with a vinyl acetate latex (30 dry parts), phthalate type plasticizer (25 parts), polysiloxane type defoamer (0.8 parts) and acrylic associative thickener (0.70 parts), creating a resultant adhesive. The resultant adhesive is coated on a typical wallcovering facestock and dried, creating a resultant wallcovering with an adhesive coatweight around 12 lbs/ream. The resultant wallcovering is applied to a latex painted wall surface and a wallcovering surface (collectively, "samples"). The samples are aged at 70° C. for seven days. After this accelerated heat aging test, the wallcovering adheres too strongly to the surfaces to be easily removed without damaging the wall surface.

COMPARATIVE EXAMPLE 2

Acrylic latex #1 (80 dry parts, 52% solids, Tg=−35 to −45° C.) is mixed with acrylic latex #2 (20 dry parts, 57% solids, Tg=−50 to 65° C.). Polysiloxane type defoamer (0.10 parts) and associative acrylic type thickener (0.02 parts) also are added, creating a resultant adhesive. The resultant adhesive is coated on typical wallcovering facestock and dried, creating a resultant wallcovering. The resultant wallcovering is applied to various surfaces to test for removability and repositionability. The wallcovering did not slide very well on the wall surfaces, therefore it did not pass the criteria for repositionability. However, the wallcovering can be peeled cleanly from all surfaces both before and after aging as shown by the peel adhesion values in Table 1

TABLE 1

Extensive Evaluation

| | A | A | | A | A |
|---|---|---|---|---|---|
| Coatweight (lbs/ream) aged = 7d @ 70° C. | 11.70 | 11.70 aged | | 11.70 | 11.70 aged |
| 90° Peel, oz/in | | | 90° Peel, oz/in | | |
| Latex Paint | | | Wall Covering Textured Vinyl | | |
| 30 min dwell | 10.0 | 5.2 | 30 min dwell | 3.4 | 2.4 |
| 24 hr. dwell | 20.2 | 8.5 | 24 hr. dwell | 3.2 | 1.9 |
| 7 day dwell | 10.6 | 7.4 | 7 day dwell | 2.4 | 1.8 |
| Enamel Paint | | | Wall Covering Smooth Vinyl | | |
| 30 min dwell | 2.8 | 5.4 | 30 min dwell | 16.4 | 13.2 |
| 24 hr. dwell | 3.6 | 4.8 | 24 hr. dwell | 13.2 | 11.5 |
| 7 day dwell | 3.6 | 3.2 | 7 day dwell | 6.8 | 7.6 |
| Wall Covering Gravure Paper | | | Stainless Steel | | |
| 30 min dwell | 13.2 | 13.2 | 30 min dwell | 16.2 | 14.0 |
| 24 hr. dwell | 12.4 | 13.1 | 24 hr. dwell | 15.4 | 18.7 |
| 7 day dwell | 11.4 | 12.0 | 7 day dwell | 21.0 | 23.2 |

COMPARATIVE EXAMPLE 3

The same acrylic latexes used for Comparative Example 2 were used in this formulation, but at a different ratio. First, acrylic latex #1 (60 dry parts, 52 % solids, Tg=−35 to −45° C.) is mixed with acrylic latex #2 (40 dry parts, 57% solids, Tg=−50 to −65° C.). Second, a nonionic surfactant (0.25 parts) polysiloxane type defoamer (0.1 parts), and associative acrylic thickener (0.05 parts) are added. Third, hollow glass bubbles (1.25 parts) are added with moderate stirring, creating a resultant adhesive. The hollow glass bubbles have a density of 0.05–0.10 g/cc, maximum size of 177 microns, and 80% pass the nitrogen pressure test at 250 psi. The resultant adhesive is coated and dried on typical wallcovering stock and tested for removability and repositionability.

The wallcovering coated with the resultant adhesive can be slid easily over the surface of a wall to match patterns, thereby achieving repositionability. Once positioned on a wall, pressure is applied to the wallcovering to crush the bubbles in the resultant adhesive. Data in Table 2 at different application pressures and after aging show that the wallcovering can be removed from the wall surface without causing surface damage.

TABLE 2

| | A | A |
|---|---|---|
| Coatweight (lbs/ream) aged = 7d @ 70° C. | 12.20 | 12.20 aged without cure system |
| 90° Peel, oz/in S/S Light Pressure - Light thumb pressure - smoothing | | |
| 30 min dwell | 12.8 | 16.8 |
| 24 hr. dwell | 12.4 | 18.0 |
| 7 day dwell | 17.2 | 23.2 |
| 90° Peel, oz/in S/S Med Pressure (PSTC) - PSTC pressure - 2 passes with 4.5 lb. roller | | |
| 30 min dwell | 14.0 | 18.0 |
| 24 hr. dwell | 16.0 | 22.0 |
| 7 day dwell | 20.8 | 25.2 |
| 90° Peel, oz/in S/S Heavy Pressure - 6 pressure applied passes with 4.5 lb. roller | | |
| 30 min dwell | 15.2 | 18.8 |
| 24 hr. dwell | 16.8 | 23.2 |
| 7 day dwell | 22.0 | 26.4 |

Conclusion

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. An adhesive for applying to a decorative sheet to cover a surface such that the decorative sheet is repositionable and removable, comprising:

a pressure sensitive adhesive having a balance of properties that provide good anchorage of the decorative sheet to the surface and that allow for removal of the decorative sheet without damage to the surface; and a plurality of hollow bubbles having a density and size to protrude through the surface of the adhesive while maintaining contact with the decorative sheet and to reduce initial tack to allow movement of the decorative sheet on the surface, said plurality of hollow bubbles having a diameter greater than a thickness of said pressure sensitive adhesive on the decorative sheet and within the range of about 40 to 177 microns having said density within the range of about 0.05 to 0.20 g/cc. and having a strength such that said hollow bubbles may be crushed upon application of pressure.

2. The adhesive according to claim 1, wherein said pressure sensitive adhesive comprises a plurality of water based acrylic emulsions having a first water based acrylic emulsion with a glass transition temperature in the range of −35° to −45° C. and a second water based acrylic emulsion with a glass transition temperature in the range of −50° C. to −65° C.

3. The adhesive according to claim 2, wherein said plurality of water based acrylic emulsions are prepared by polymerizing one or more acrylate monomers in a water containing surfactants using free radical type initiators, wherein said acrylate monomers are selected from a group of ethyl acrylate, butyl acrylate, octyl acrylate, 2-ethylhexyl acrylate and acrylic acid.

4. The adhesive according to claim 3, further comprising additional monomers copolymerized with said acrylate monomers, wherein said additional monomers are selected from the group of methyl methacrylate, butyl methacrylate, acrylonitrile and vinyl acetate.

5. The adhesive according to claim 1, wherein said pressure sensitive adhesive is a polymeric emulsion selected from the group of styrene/butadiene emulsions, vinyl acetate emulsions, and natural rubber latex.

6. The adhesive according to claim 1, wherein said pressure sensitive adhesive is a permanent adhesive.

7. The adhesive according to claim 1, further comprising one or more processing aids selected from the group of surfactants, defoamers, thickeners, and tackifying resins.

8. The adhesive according to claim 7, wherein said pressure sensitive adhesive is one or more polymeric emulsions and said tackifying resins are selected from the group of rosins, rosin ester resins, aliphatic/aromatic or aromatic hydrocarbon resins, and resins based on terpene derivatives.

9. The adhesive according to claim 1, wherein said hollow bubbles are selected from the group of glass, ceramic, and plastic.

10. The adhesive according to claim 1, wherein said strength of said plurality of hollow bubbles results in a twenty percent (20%) destruction rate of said hollow bubbles upon application of pressure up to 250 psi.

11. The adhesive according to claim 1, wherein said strength of said plurality of hollow bubbles results in a twenty percent (20%) destruction rate of said hollow bubbles upon application of pressure up to 750 psi.

12. An adhesive for applying to a wallcovering to cover a surface such that the wallcovering is repositionable and removable, comprising:

a pressure sensitive adhesive having a balance of properties that provide good anchorage of the wallcovering to the surface and that allow for removal of the wallcovering without damage to the surface, comprising a first acrylic latex of 60 dry parts, 52% solids and with a glass transition temperature in the range of −35° to −45° C., and a second acrylic latex emulsion of 40 dry parts, 57% solids and with a glass transition temperature in the range of −50° to −65° C.; and a plurality of hollow glass bubbles having a density and size to be present at the surface of the adhesive while maintaining contact with the wallcovering and to reduce initial tack to allow movement of the wallcovering on the surface, said size having a diameter greater than a thickness of said pressure sensitive adhesive on the wallcovering such that said size has a maximum diameter of 177 microns, and having a strength such that said hollow bubbles may be crushed upon application of pressure.

13. The adhesive according to claim 12, further comprising:

a nonionic surfactant of 0.25 parts,
a polysiloxane type defoamer of 0.1 parts, and
an associative acrylic thickener of 0.05 parts.

14. The adhesive according to claim 13, wherein said hollow bubbles are selected from the group of glass, ceramic, and plastic.

15. The adhesive according to claim 13, wherein said density of said plurality of hollow bubbles is within the range of 0.23 to 0.27 g/cc.

16. The adhesive according to claim 12, wherein said strength of said plurality of hollow bubbles results in an eighty percent (80%) survival rate of said hollow bubbles upon application of pressure up to 250 psi.

17. The adhesive according to claim 12, wherein said strength of said plurality of hollow bubbles results in an eighty percent (80%) survival rate of said hollow bubbles upon application of pressure up to 750 psi.

18. The adhesive according to claim 13, further comprising one or more processing aids selected from the group of surfactants, defoamers, thickeners, and tackifying resins.

19. The adhesive according to claim 12, wherein said density of said hollow bubbles is within the range of about 0.05 to 0.20 g/cc.

20. An adhesive for applying to a decorative sheet to cover a surface such that the decorative sheet is repositionable and removable, comprising:

a pressure sensitive adhesive having a balance of properties that provide good anchorage of the decorative sheet to the surface and that allow for removal of the decorative sheet without damage to the surface;

a plurality of hollow bubbles having a diameter greater than a thickness of said pressure sensitive adhesive on the decorative sheet and within the range of about 40 to 177 microns, having a density within the range of about 0.05 to 0.20 g/cc, and having a strength such that said hollow bubbles may be crushed upon application of pressure;

a means for protruding said plurality of hollow bubbles through the surface of the adhesive while maintaining contact with the decorative sheet; and a means for reducing initial tack of the adhesive by using said plurality of hollow bubbles to allow movement of the decorative sheet on the surface.

21. The adhesive according to claim 20, wherein said strength of said plurality of hollow bubbles results in a twenty percent (20%) destruction rate of said hollow bubbles upon application of pressure up to 250 psi.

22. The adhesive according to claim 20, wherein said strength of said plurality of hollow bubbles results in a twenty percent (20%) destruction rate of said hollow bubbles upon application of pressure up to 750 psi.

23. The adhesive according to claim 20, wherein said hollow bubbles are selected from the group of glass, ceramic, and plastic.

24. The adhesive according to claim 20, further comprising one or more processing aids selected from the group of surfactants, defoamers, thickeners, and tackifying resins.

25. The adhesive according to claim 20, wherein said pressure sensitive adhesive comprises a plurality of water based acrylic emulsions having a first water based acrylic emulsion with a glass transition temperature in the range of −35° to −45° C. and a second water based acrylic emulsion with a glass transition temperature in the range of −50° to −65° C.

26. The adhesive according to claim 25, wherein said plurality of water based acrylic emulsions are prepared by polymerizing one or more acrylate monomers in water containing surfactants using free radical type initiators, wherein said acrylate monomers are selected from a group of ethyl acrylate, butyl acrylate, octyl acrylate, 2-ethylhexyl acrylate and acrylic acid.

27. The adhesive according to claim 26, further comprising additional monomers copolymerized with said acrylate monomers, wherein said additional monomers are selected from the group of methyl methacrylate, butyl methacrylate, acrylonitrile, and vinyl acetate and styrene.

28. The adhesive according to claim 20, wherein said pressure sensitive adhesive is a polymeric emulsion selected from the group of styrene/butadiene emulsions, vinyl acetate emulsions, and natural rubber latex.

29. The adhesive according to claim 20, wherein said pressure sensitive adhesive is a permanent adhesive.

\* \* \* \* \*